United States Patent
Yamasaki et al.

(10) Patent No.: US 7,228,855 B2
(45) Date of Patent: Jun. 12, 2007

(54) METHOD FOR CUTTING A SINGLE CRYSTAL INGOT

(75) Inventors: Masahiko Yamasaki, Tokyo (JP); Yoshitsugu Ohigashi, Tokyo (JP)

(73) Assignee: Sumco Corporation, Tokyo (JP)

( * ) Notice: Subject to any disclaimer, the term of this patent is extended or adjusted under 35 U.S.C. 154(b) by 0 days.

(21) Appl. No.: 11/350,583

(22) Filed: Feb. 8, 2006

(65) Prior Publication Data

US 2006/0174862 A1 Aug. 10, 2006

(30) Foreign Application Priority Data

Feb. 8, 2005 (JP) ............... 2005-032040

(51) Int. Cl.
*B28D 1/08* (2006.01)
(52) U.S. Cl. ............ 125/21; 83/62.1
(58) Field of Classification Search ......... 83/820, 83/62, 62.1; 125/23.01, 13.02, 21
See application file for complete search history.

(56) References Cited

U.S. PATENT DOCUMENTS

| | | | |
|---|---|---|---|
| 4,289,053 A * | 9/1981 | Sawamura ............. | 83/62.1 |
| 4,355,555 A * | 10/1982 | Kobayashi et al. ....... | 83/62.1 |
| 5,070,751 A * | 12/1991 | Harris ............. | 83/62.1 |
| 5,616,065 A * | 4/1997 | Egglhuber ........... | 451/10 |
| 6,021,772 A * | 2/2000 | Seifert et al. ......... | 125/13.02 |
| 2001/0002561 A1* | 6/2001 | Shiraga et al. ........ | 83/13 |

* cited by examiner

*Primary Examiner*—Jacob K. Ackun, Jr.
(74) *Attorney, Agent, or Firm*—Reed Smith LLP

(57) ABSTRACT

The object of the present invention is to provide a method whereby it is possible to cut a single crystal ingot comparatively accurately while allowing resulting slices to have a flat surface, and to lengthen the life of the blade more than would be possible with conventional methods. A single crystal ingot 10a is arranged below a straightly running portion 18a of the blade which is made to run endlessly along a circuit such that the longitudinal axis of ingot 10a crosses at right angles with the straightly running portion 18a of the blade, thereby enabling the straightly running portion 18a of the blade to cut the ingot 10a perpendicularly. If the blade is inclined to one side, the cutting machine detects a shift A between the uppermost end of cut surface 10b and its lowermost end projected to the longitudinal axis of ingot, and corrects the inclination of the blade by tilting the imaginary cut surface 10c including the straightly running portion of the blade in the opposite direction by an angle with respect to a line vertical to the longitudinal axis of ingot 10a such that shift B is equal to shift A. Subsequent to correction, cutting is further continued with the straightly running portion 18a of the blade whose inclination has been just corrected.

6 Claims, 8 Drawing Sheets

METHOD FOR CUTTING A SINGLE CRYSTAL INGOT

CROSS-REFERENCES TO RELATED APPLICATIONS

This application claims priority of Japanese Application No. 2005-032040 filed Feb. 8, 2005, the entire disclosure of which is hereby incorporated by reference.

BACKGROUND OF THE INVENTION

1. Field of the Invention

The present invention relates to a method for cutting a single crystal ingot wherein a straightly running portion of the endless circuiting blade is used for cutting a single crystal ingot.

2. Description of the Related Art

Conventionally, with regard to cylindrical single crystal ingots which serve as a material of silicon wafers, the CZ method has been mainly used for the manufacture of ingots having a diameter of 8 inch or less. When a cylindrical single crystal ingot is produced by the CZ method, it has its top and tail portions removed before it is sliced into wafers. The remaining body portion is divided by cutting into several blocks and some wafers are sampled from those blocks. In order to remove the top and tail portions of a cylindrical single crystal ingot, and to divide the resulting body portion into several blocks, a cutting machine called a band saw has been used. The band saw type cutting machine comprises a pair of pulleys rotating round their respective central, vertical axes which are separated from each other by a specified distance with an endless belt-like blade is tightly wound around the rims of those pulleys. The blade is obtained by coating diamond particles by electric deposition onto both lower ends of an endless belt. When one pulley is put into rotation, the blade runs a circuit defined by the rims of the two pulleys at a high speed.

When the blade runs along the rim of a pulley, it takes a round course. When the blade runs a space between the two pulleys, it runs a straight course with sideward swings unless otherwise treated. To prevent these sideward swings, blade guides are provided at both ends of the straight course where cutting occurs. Each blade guide has two limbs with a slit in between and the two limbs have carbon shoes in their inner surfaces such that, when the blade guide receives the blade in its slit, the carbon shoes are brought into contact with both surfaces of the blade. This arrangement allows the blade to run a straight course in the same cutting direction constantly. A single crystal ingot is arranged below the straight course of the blade such that the longitudinal axis of the ingot crosses at right angles with the direction of the straight course the blade takes during running. For cutting the ingot, the pair of pulleys are allowed to descend vertically while the blade is running along their rims so that the straightly running portion of the blade is brought into contact with the single crystal ingot below to cut the latter.

Currently, cylindrical single crystal ingot used as a material in the manufacture of silicon wafers comes to have an increasingly large diameter to meet requirements for the low cost production of wafers, because low cost production of wavers leads to the production of competitive semiconductors. Some single crystal ingots currently made have a diameter up to 12 inches. When a band-saw type cutting machine is used to cut cylindrical single crystal ingots having a diameter as large as 12 inch, the cutting machine must have a sufficiently wide blade on an endless belt and two pulleys must be separated sufficiently widely apart to allow the blade to run a sufficiently long straight course to encompass that potbellied ingot. However, if the straight course the blade takes during running is made too long, the blade will be more prone to sideward swings which, if present, will degrade the cut precision of the cutting machine.

In order to meet this problem, a method for cutting single crystal ingot has been proposed (for example, see Patent Document 1). According to the method, to each blade guide are provided a sensor for detecting sideward swings of the blade running nearby, and two fluid jet nozzles facing both sides of the blade, such that if the blade is subject to a sideward swing, and the sensor detects the swing exceeds a certain limit, one fluid jet nozzle at a side to which the blade is swung is activated to jet liquid onto the swung blade to push it back, thereby canceling the swing and recovering the straightness of the course of the blade. It has been reported that according to the method it is possible to cut single crystal ingot comparatively precisely because the sideward swings of the blade can be checked and corrected constantly.

Patent Document 1: Japanese Patent No. 2727421 (Claims)

The blade consists of diamond particle files formed by electric deposition on the lower margins of an endless belt, and thus with the repeated use in the cutting of ingots, the blade is increasingly cleaned of diamond particles as a natural process. However, natural cleaning of diamond particles does not occur evenly over the blade. It often occurs that some parts of the blade are cleaned of diamond particles heavily while other parts remain comparatively unaffected, which may determine a preferred direction for the blade to take during cutting. The blade having a skewed predilection in the cutting direction will degrade the precision of cutting unless properly treated. However, if such a blade is inclined to a preferred direction divergent from a normal specified direction during cutting, it is hardly possible, according to the aforementioned conventional method, to forcibly push back the inclined blade by applying fluid jet to the blade because the inclining tendency of the blade is inherent to the blade itself. This makes it difficult to achieve the stable cutting of ingots. In addition, the pressure wrought by the fluid jet applied to the bent side of the blade is often subject to variation, and if the blade is exposed to such varied pressure, the slice cut by the blade will have cut surfaces with stepwise undulations: the surface of the slice will have a degraded flatness. Moreover, because the pressure wrought by the fluid jet acts in a direction normal to the direction in which the blade runs during cutting, the tension of the blade is enhanced, giving extra stresses to the blade which will shorten the due life of the blade.

SUMMARY OF THE INVENTION

The object of the present invention is to provide a method for cutting a single crystal ingot whereby it is possible to cut a single crystal ingot comparatively accurately while allowing resulting slices to have a flat surface, and whereby it is possible to lengthen the life of the blade more than would be possible with conventional methods.

An aspect of the invention as described in Claim 1 relates to an improved method for cutting a single crystal ingot using a band saw type cutting machine comprising, as shown in FIG. 2, a pair of pulleys 17, 17 rotating round their respective central, vertical axes 17a, 17a which are separated from each other by a specified distance with an endless belt-like blade 18 being tightly wound around the rims of those pulleys 17, 17, wherein the blade is made to run a circuit via the rotation of pulleys 17, 17, a single crystal ingot 10a is arranged below a straightly running portion 18a of the blade such that the longitudinal axis of ingot 10a crosses at right angles with the straightly running portion 18a of the blade, and the pair of pulleys 17, 17 are allowed to descend vertically so that the straightly running portion 18a of the blade is brought into contact with ingot 10a below to cut the latter.

A feature of this aspect of the invention is the correction of the inclination, if any, of the blade with respect to an ingot 10a to be cut as shown in FIG. 1: if the blade is inclined by a certain angle with respect to a line vertical to the longitudinal axis of an ingot 10a and the inclination produces a shift A at the lowest end of cut surface 10b, the cutting machine detects the shift A, and corrects the inclination of the blade with respect to the ingot 10a so as to cancel out the shift A by tilting the imaginary cut surface 10c including the straightly running portion 18a of the blade in the opposite direction by a certain angle with respect to a line vertical to the longitudinal axis of ingot 10a, calculating an expected shift B obtained at the lowest end of imaginary cut surface 10c, when ingot 10a is assumed to be cut by the tilted blade, between the uppermost end of imaginary cut surface 10c and its lowermost end projected to the longitudinal axis of ingot 10a, and adjusting the tilted angle such that shift B is equal to shift A. An additional feature of this aspect of the invention is to momentarily correct the inclination of the straightly running portion 18a of the blade if any, and to continue the cutting with the corrected blade thereafter without interruption.

According to the aspect of the invention as described in Claim 1, even if the preferred cutting direction of the blade 18 diverges from a normal specified direction, it is possible to cancel out the divergence by tilting the straightly running portion 18a of the blade 18 by the same angle with the divergent angle in the opposite direction, and thus it is possible even then to cut an ingot 10a comparatively vertically. Moreover, once correction of the blade angle is achieved, application of fluid jet to the surfaces of the blade 18 engaged in cutting is withdrawn which keeps the blade from being exposed to the change of pressure, and relieves the surfaces 10b of cut slices of an ingot 10a of step-like undulations. Furthermore, since correction of the blade is based only on tilting and does not include any bending, tension of the blade 18 does not change in any way due to the correction operation. Thus, the shortening of life of the blade which would result if tension were increased as a result of correction can be safely avoided.

The term "imaginary cut surface" used herein refers to an imaginary surface of a slice obtained if a line representing the straightly running portion 18a of the blade 18 traverses an ingot 10a, that is, an imaginary surface of a slice obtained if a line representing the straightly running portion 18a of the blade 18 is assumed to move downward in parallel with the surface of the portion to cut the single crystal ingot 10a.

A second aspect of the invention as described in Claim 2 is an extension of the first aspect of the invention described in Claim 1 and relates to a method for cutting a single crystal ingot using a band saw type cutting machine which further comprises a pair of members 22, 22 facing to each other with an interval larger than the thickness of the blade 18 on both sides of the straightly running portion 18 of the blade as shown in FIG. 3, each facing side of members 22, 22 being equipped with respective nozzles 22a, 22a, wherefrom, if the blade is inclined to one side, fluid jets are applied onto both sides of the straightly running portion 18a of the blade so as to correct the inclination of the blade.

According to the method as described in Claim 2 for cutting a single crystal ingot, if the straightly running portion 18a of the blade is inclined to one side, correction of the inclination is achieved by applying fluid jets from the nozzles provided to the pair of opposed members to the inclined blade. Therefore, it is comparatively easy to return the inclined straightly running portion 18a of the blade to a desired position by appropriately adjusting the pressures wrought by those fluid jets. The pair of opposed members 22, 22 has space between them so wide as to allow the blade to run through the space without touching the members which will contribute to the lengthening of life of the involved members, i.e., the pair of opposed members and blade.

According to a method of the invention for cutting a single crystal ingot, the correction of the inclination, if any, of a blade with respect to an ingot to be cut is achieved by following procedures: if the blade is inclined by a certain angle with respect to a line vertical to the longitudinal axis of an ingot and the inclination produces a certain shift at the lowest end of cut surface, the method detects the shift, and corrects the inclination of the blade with respect to the ingot so as to cancel out the shift by tilting the imaginary cut surface including the straightly running portion of the blade in the opposite direction by a certain angle with respect to a line vertical to the longitudinal axis of ingot, calculating an expected shift obtained at the lowest end of imaginary cut surface when the ingot is assumed to be cut by the tilted blade, and adjusting the tilted angle such that the expected shift is equal to the real shift. The inclination of the straightly running portion of the blade if any is corrected momentarily, and proper cutting readily resumes with the corrected blade without interruption. Even if the preferred cutting direction of the blade diverges from a normal specified direction, it is possible to cancel out the divergence by tilting the straightly running portion of the blade by the same angle with the divergent angle in the opposite direction, and thus it is possible even then to cut an ingot comparatively vertically.

According to an embodiment of the invention, a band saw type cutting machine further comprises a pair of opposed members on both sides of a straight course the blade runs during cutting, the pair of members being equipped with respective nozzles. If the straightly running portion of the blade is inclined to one side, correction of the inclination is achieved by applying fluid jets from the nozzles provided to the pair of opposed members to the inclined blade. Therefore, it is comparatively easy to return the inclined straightly running portion of the blade to a desired position by appropriately adjusting the pressures wrought by those fluid jets. Moreover, once correction of the inclination of the blade is achieved, application of fluid jets to the surfaces of the blade engaged in cutting is withdrawn which keeps the blade from being exposed to the change of pressure, and relieves the surfaces of cut slices of step-like undulations. Furthermore, since correction of the blade is based only on tilting and does not include any bending, tension of the blade 18 does not change in any way due to the correction operation. Thus, shortening of life of the blade which would result if tension were increased as a result of correction can be safely avoided.

DESCRIPTION OF THE PREFERRED EMBODIMENTS

The embodiments representing the best mode of application of the present invention will be described with reference to the attached drawings.

Figure 7:
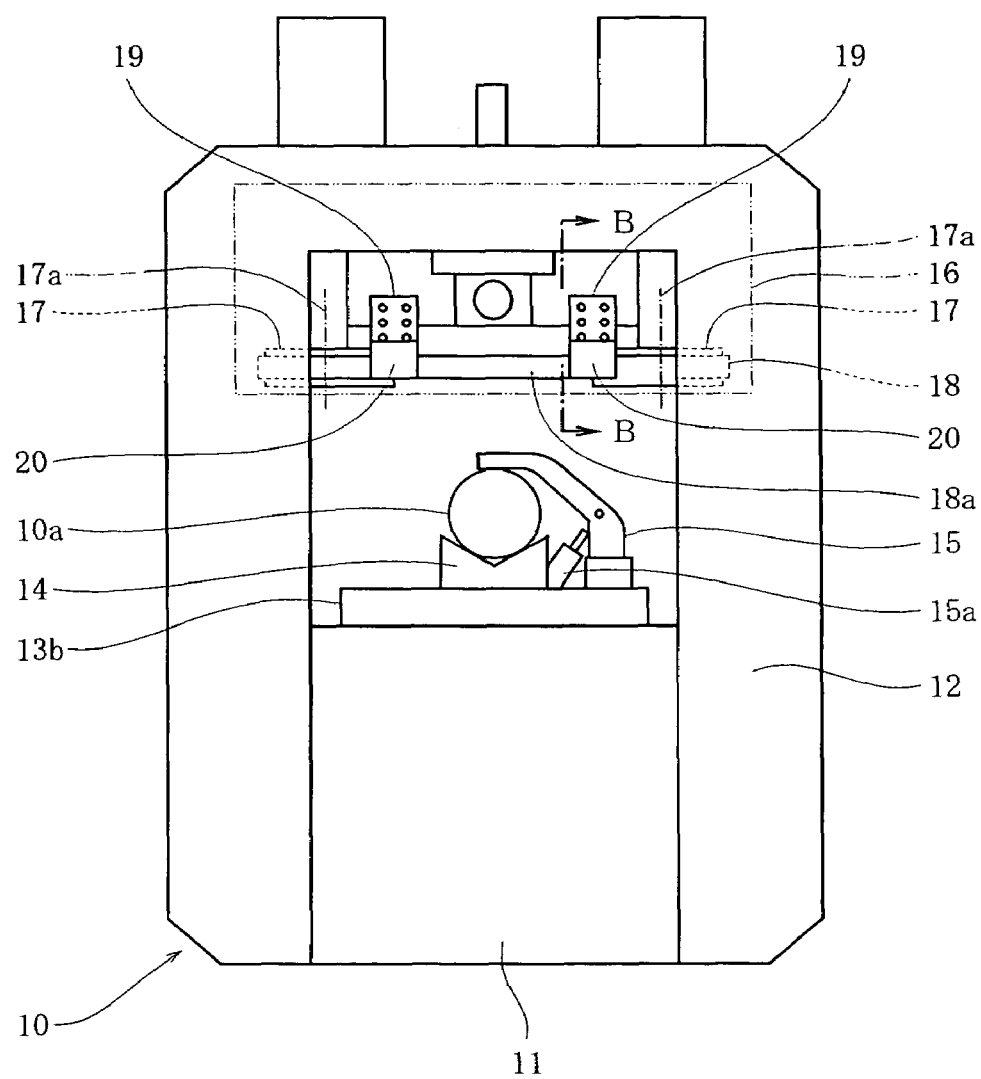
FIG. 7 is a front view of the cutting machine.
Figure 8:
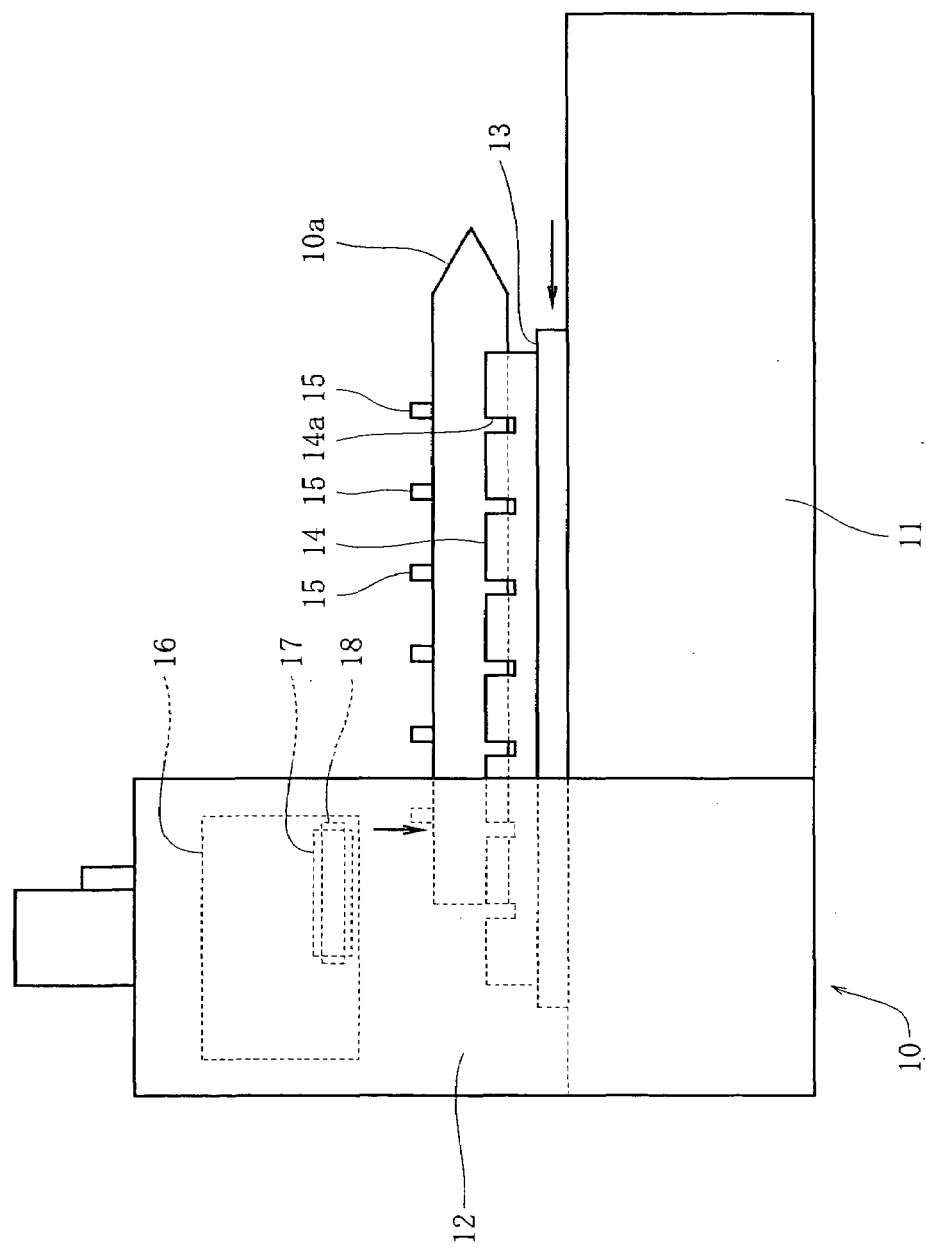
FIG. 8 is a lateral view of the cutting machine.

FIGS. 7 and 8 represent a cutting machine 10 used according to the present invention for cutting single crystal ingot. The cutting machine 10 comprises a platform 11 for supporting an ingot 10a horizontally, and, in front of the platform 11, an inverted U-shaped frame 12 encompassing the platform 11. On the platform 11, there is provided a table 13 for carrying an ingot 10a thereon which is movable in an anterior-posterior direction. On the table 13 there is provided a base 14 for directly supporting the ingot 10a. In order to ensure the cutting of ingot 10a to occur at specified levels, there are provided notches whose profile is v-shaped (not illustrated) on the base 14 at specified positions where the ingot 10a will be cut such that, when a below-described blade 18 cuts ingot 10a at a specified position, the notch can receive the blade 18 in its empty space. Close to each specified position where the ingot 10a will be cut, there is provided a holder 15 for securely stabilizing the ingot 10a which is driven bit by bit via a cylinder 15a (FIG. 7). Each of the ingot holder 15 can move on table 13 together with base 14.

Figure 2:
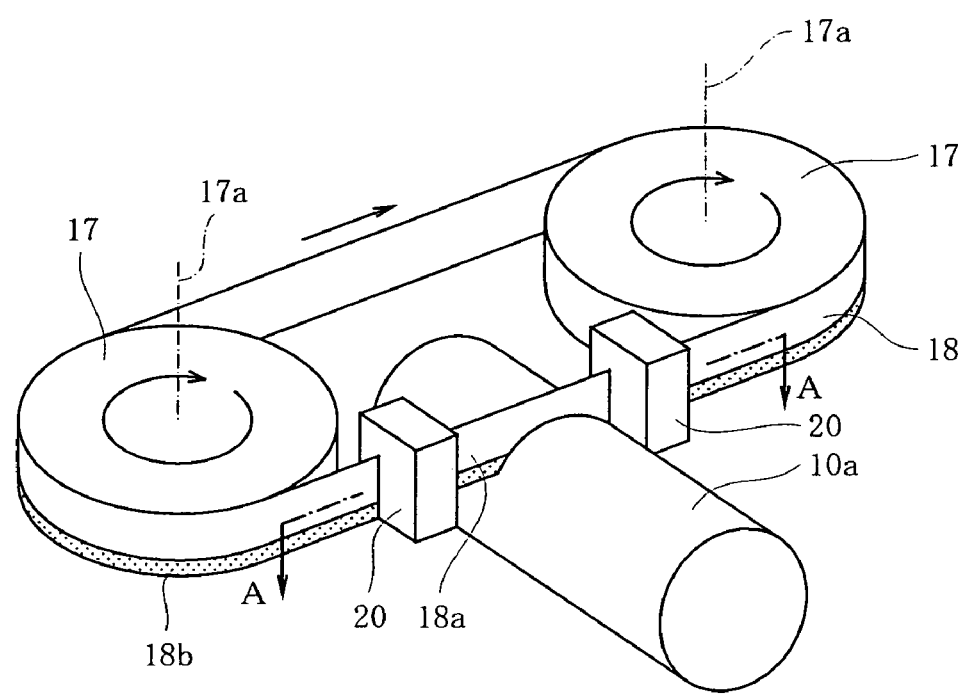
FIG. 2 is a perspective view showing how the ingot is cut with a band saw blade.

The U-shaped frame 12 incorporates, in its upper beam, a cutter unit 16 capable of ascending or descending. The cutter unit 16 comprises a pair of pulleys 17, 17 rotating round their respective central, vertical axes 17a, 17a which are separated from each other by a specified distance with an endless belt-like blade 18 is tightly wound around the rims of those pulleys 17, 17. As seen from FIG. 2, one of the pulleys 17, 17 is actively rotated while the other pulley is passively rotated. The blade 18 consists of diamond particle files 18b formed by electric deposition on the lower margins of an endless belt, and runs, driven by the active pulley 17, a circuit defined by the rims of the two pulleys at a high speed. A straightly running portion 18a of the blade 18 is allowed to keep on running straight by means of the blade guides 20, 20 provided at both ends of the straightly running portion of the blade. Then, the cutter unit 16 in which the blade 18 is running along a circuit defined by the two pulleys 17, 17 at a high speed is allowed to descend together with the pulleys 17, 17 so that the straightly running portion 18a of the blade 18 is brought into contact with the ingot 10a below whose longitudinal axis has been arranged to be vertical to the cutting direction of the blade. Thus, the ingot 10a is vertically cut by the straightly running portion 18a of the blade 18.

Figure 6:
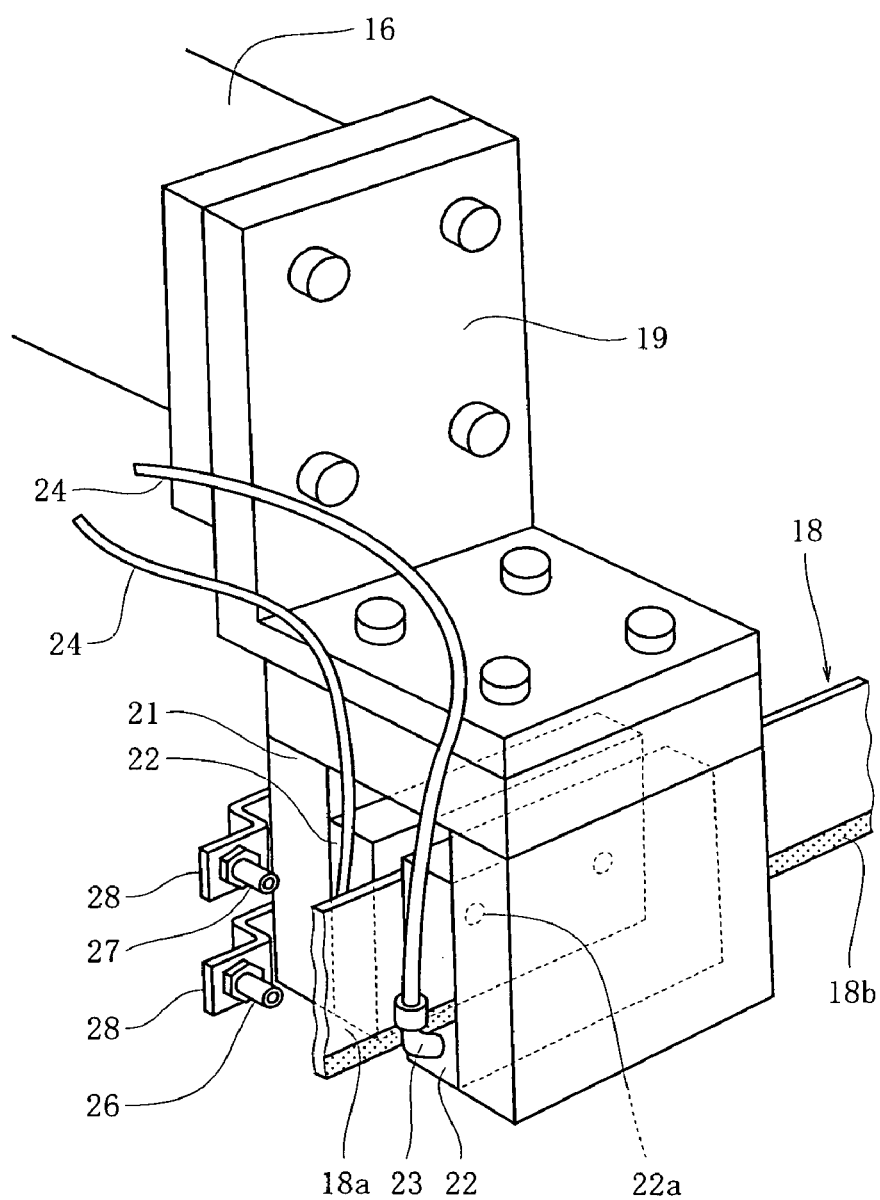
FIG. 6 is a perspective view of one of the two blade guides provided to both ends of a straightly running portion of the blade.

As shown in FIG. 6, each blade guide 20 is mounted to the cutter unit 16 via a joining member 19. The blade guide 20 comprises a reverse U-shaped supportive member 21 which will receive the straightly running portion 18a of a blade 18 in a space between its two limbs, and a pair of opposed members 22, 22 which are detachably attached to the opposed surfaces of supportive member 21. The pair of opposed members 22, 22 have a space between them with a specified distance which is so large as to allow the straightly running portion 18a of the blade 18 to pass through the space. Each of the opposed members 22, 22 has, on its opposed surface, plural nozzle orifice 22a, 22a each in the form of a flat plate-like jacket which are connected via a pipe to a nipple 23 on the crosswise side of the opposed member 22 such that water fed through nipple 23 can be transported to the nozzles 22a, 22a. The nozzle orifices 22a, 22a of each opposed member are arranged with a specified distance apart from each other along a line in parallel with the direction in which the straightly running portion 18a of the blade 18 runs.

Figure 4:
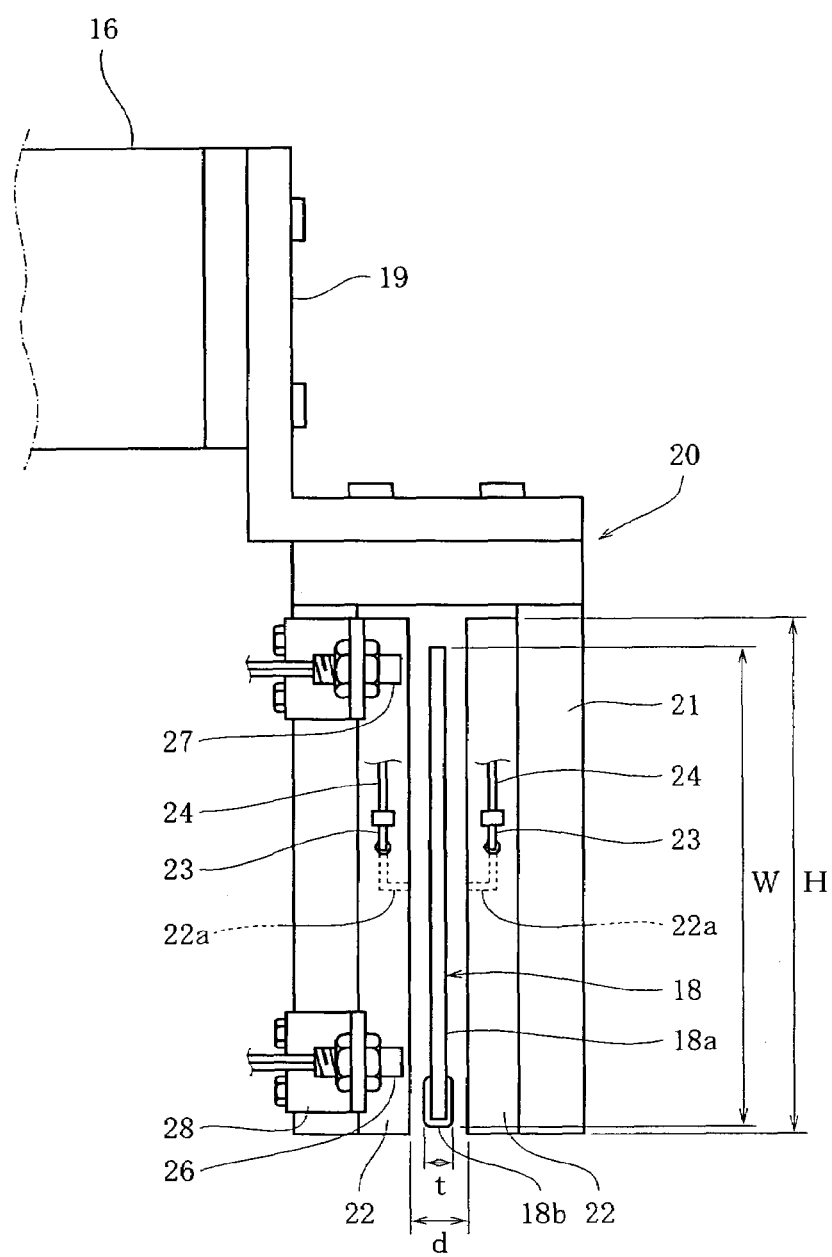
FIG. 4 is a sectional view of the cutting machine sectioned along line B-B of FIG. 7.
Figure 5:
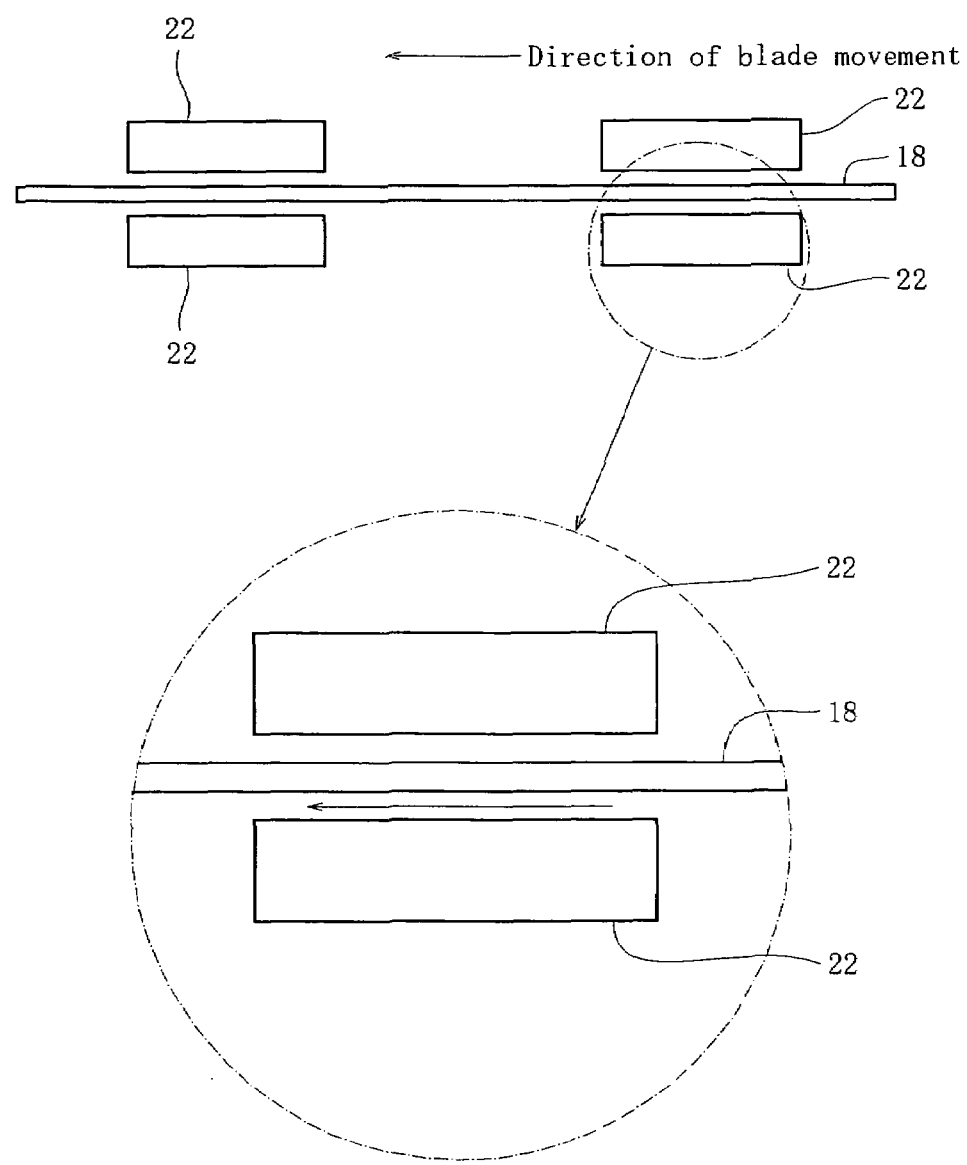
FIG. 5 is a sectional view of the cutting machine sectioned along line A-A of FIG. 2.

As shown in FIG. 5, the opposed members 22, 22 of each of the blade guide 20, 20 which will allow the passage of the straightly running portion 18a of the blade 18 through a space between them are attached to their respective supportive members 21. As shown in FIG. 4, the distance d between the opposed members 22, 22 is chosen to be larger than the thickness t of the blade 18 so that the straightly running portion of the blade 18 can smoothly pass through the space defined by the opposed members 22, 22 without touching those members. The height H of each of the opposed members 22, 22 is chosen to be larger than the width W of the blade 18 so that the opposed members 22, 22, when they receive the straightly running portion 18a of the blade 18 in their space, can allow each of their opposed faces to fully encompass the whole width of the blade 18. The joining member 19 for mounting a blade guide 20 to the cutter unit 16 consists of a brace having an L-shaped profile. Its horizontal portion is fastened by screwing to the top of a blade guide 20 and its vertical portion is fastened by screwing to the cutter unit 16. Thus, the blade guide 20 is attached to the frame 16.

Figure 3:
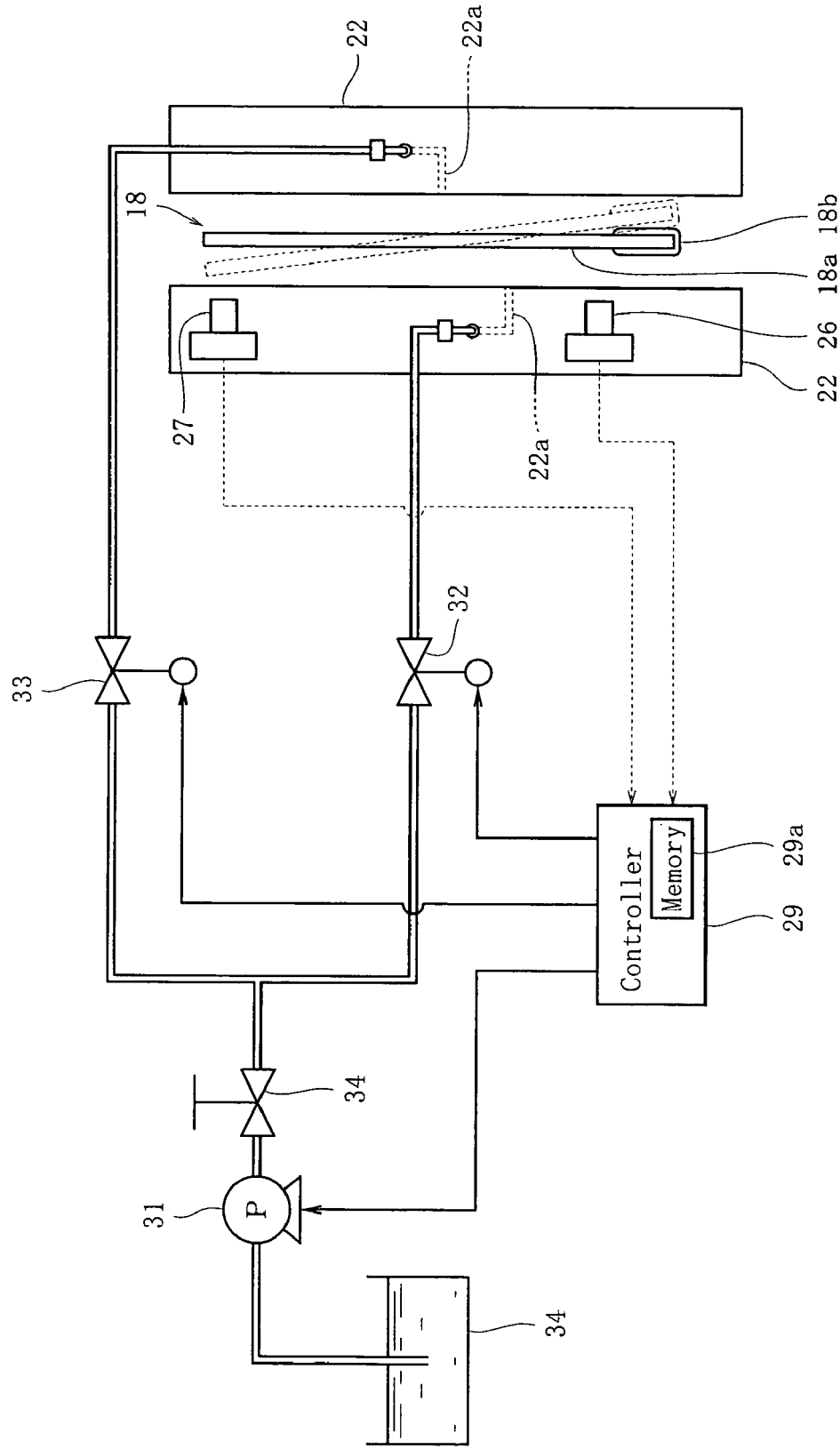
FIG. 3 is a diagram showing the elements responsible for returning an inclined blade to an original straight position by applying fluid jets to both sides of the blade.

Each blade guide 20 is provided with a first eddy current sensor 26 at its lower portion and a second eddy current sensor 27 at its upper portion: the first sensor 26 is for detecting the inclination of the lowermost edge or cutting edge of the straightly running portion 18a of the blade 18 without touching the blade 18, and the second sensor 27 is for detecting the inclination of the uppermost end of the straightly running portion 18a of the blade 18 without touching the blade 18. Each of the sensors is mounted via a crank-shaped joining bracket 28. As shown in FIG. 3, the cables from the first and second eddy current sensors 26, 27 are connected to the input terminals of a controller 29 such that detection signals from the sensors can be fed to the controller. The cables from controller 29 are connected to a pump 31 which drives water under pressure to the opposed members 22, 22, and to first and second pressure adjusting valves 32, 33 so that pressure applied to water driven to the opposed members 22, 22 can be adjusted by the controller 29 via those valves. Numeral 34 of FIG. 3 represents a reservoir for storing water which is ejected in the form of water jets from the opposed members 22, 22, and numeral 36 represents a manually operable valve for arresting the flow of water jets by hand.

Next, the process according to which a single crystal ingot is cut by a method of the invention will be described.

According to the invention, the cross-section of the straightly running portion 18a of the blade 18 is arranged to be vertical to the longitudinal axis of an ingot 10a to be cut before cutting is started. Before cutting, the table 13 on platform 11 of cutting machine 10 is withdrawn to the rearmost position, and an ingot 10*a* to be cut is placed on base 14 horizontally and immobilized there by means of ingot holders 15, 15. Then, the table 13 is allowed to move forward until a first cut level of the ingot 10*a* comes to a position corresponding to the cutting position within U-shaped frame 12. At this point of time, the cutter unit 16 is retreated at the topmost position within U-shaped frame 12. On arrival of the first cut level of ingot 10*a* to the cutting position within U-shaped frame 12, the table 13 is stopped to be stabilized there; the blade 18 is allowed to run a circuit at a high speed within the cutter unit 18; and the cutter unit 16 is allowed to descend. By continuing this operation, it is possible to cut the ingot 10*a* with the straightly running portion 18*a* of the blade 18.

While the blade 18 runs a circuit at a high speed, water is supplied via tubes 24 and nipples 23 to opposed members 22, 22 of each blade guide 20 which also serve as nozzles. Water jets ejected from the nozzle orifices 22*a*, 22*a* provided on the opposed faces of opposed members 22, 22 are applied on both sides of the straightly running portion 18*a* of the blade 18. When the pressures responsible for ejection of water jets from the opposed members 22, 22 are adjusted to be equal, it is possible to form water films equal in pressure and thickness in the two thin gaps each of which is formed between a face of the straightly running portion 18*a* of the blade 18 and a face of opposed member 22 the two faces being opposite to each other. This allows the pressures of water jets from opposed members 22, 22 to be effectively transmitted to both sides of the straightly running portion 18*a* of the blade.

Figure 1:
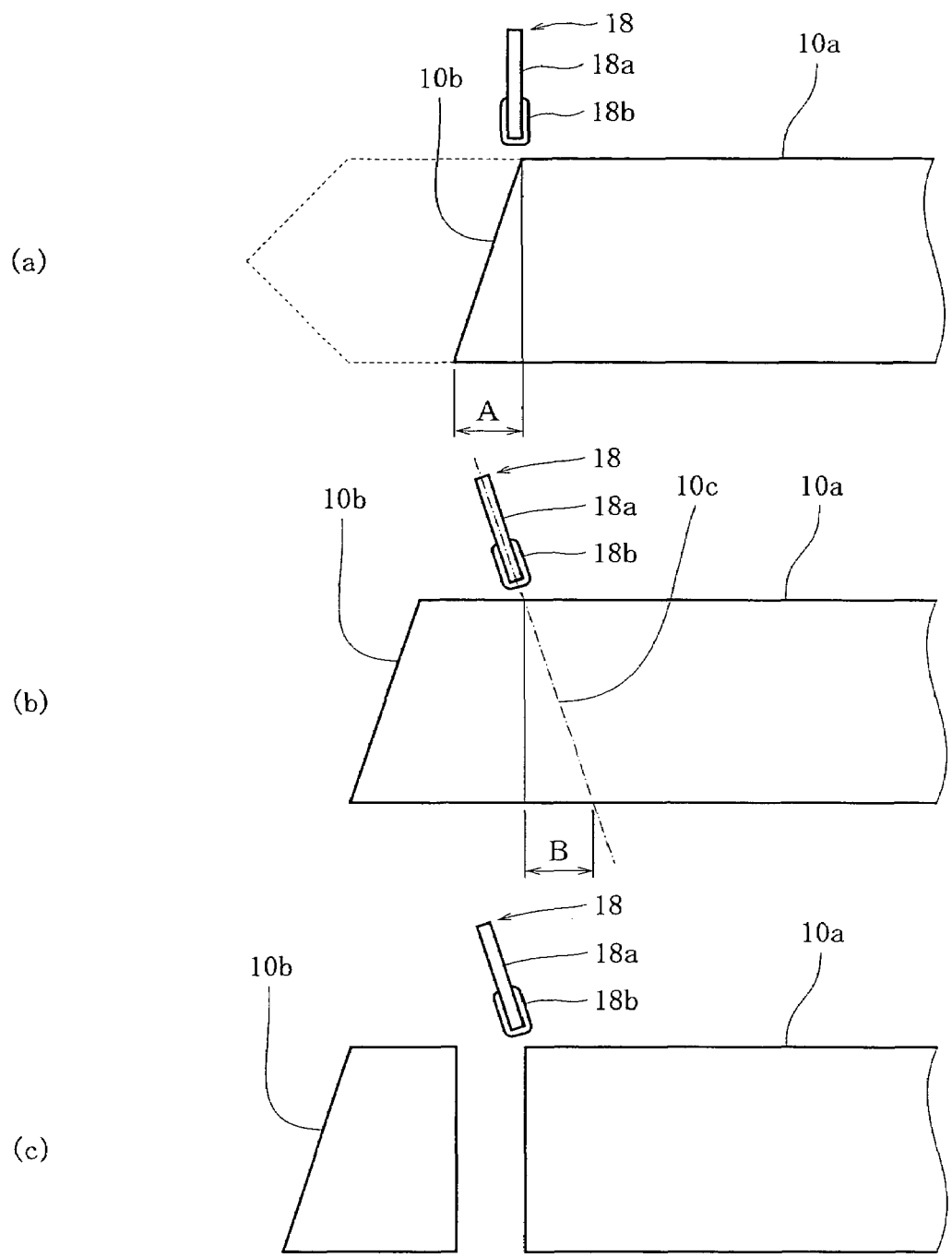
FIG. 1 shows the procedures employed in an embodiment of the invention for cutting a single crystal ingot.

Then, as shown in FIG. 1(*a*), after cutting a slice, the cutting machine detects a shift A on the lowermost end of cut surface 10*b* of ingot 10*a* because the blade 18 is inclined with respect to a line vertical to the longitudinal axis of ingot 10*a*. With regard to the blade 18, diamond particles 18*b* coated on an endless belt are sequentially torn off after repeated use as a natural process. However, natural cleaning of diamond particles 18*b* does not occur evenly over blade 18. It often occurs that some parts of the blade 18 are cleaned of diamond particles preferentially while other parts remain comparatively unaffected, which may determine a preferred direction for the blade 18 to take during cutting. If the blade 18 has a skewed predilection in the cutting direction, the cut surface 10*b* of ingot 10*a* might not be perpendicularly oriented, even if the cross-section of the straightly running portion 18*a* of the blade 18 is made vertical to the longitudinal axis of ingot 10*a* prior to cutting.

Detection of shift A between the lowermost cut end and the uppermost cut end projected to the longitudinal axial line of ingot 10*a* is performed by the first and second eddy current sensors 26, 27. More specifically, detection of the shift in question proceeds as follows. When ingot 10*a* is rightly cut along a plane perpendicular to its longitudinal axis, the uppermost cut end and the lower most cut end of cut surface 10*b* are on the same line vertical to the longitudinal axis of ingot with no shift A between the lowermost cut end of cut surface 10*b* and its uppermost cut end projected on the longitudinal axis of ingot 10*a*. Thus, blade 18 is kept vertical with no bending with respect to ingot 10*a* during cutting, and meanwhile outputs from the first and second eddy current sensors are the same and constant. On the other hand, if the cut surface 10*b* of ingot 10*a* is inclined, the blade 18, even if it is kept vertical at the start of cutting, should undergo inclination during cutting. In this case, outputs from the first and second eddy current sensors 26, 27 change with the progression of cutting from the start till the end. The controller 29 estimates, based on detection outputs provided by the two sensors from the start of cutting till the end of cutting, shift A between the lowermost cut end of cut surface 10*b* and its uppermost cut end projected on the longitudinal axis of ingot 10*a*. It should be noted that in this particular embodiment description has been given on the premise that the cutter unit includes the first and second eddy current sensors 26, 27 or plural sensors, but the number of sensors is not limited to two or more. The cutter unit, even when it includes only one eddy current sensor 26, can estimate shift A from the knowledge of the initial cutting position of the cutting under study.

If the ingot 10*a* is cut along a plane only slightly divergent from a vertical plane, and shift A between the lowermost cut end of cut surface 10*b* and its uppermost cut end projected on the longitudinal axis of ingot 10*a* is less than a specified value, the cutter machine continues to cut without any adjustment. However, the cutting plane 10*b* of ingot 10*a* is inclined so much from a vertical plane that shift A between the lowermost cut end of cut surface 10*b* and its uppermost cut end projected on the longitudinal axis of ingot 10*a* exceeds the specified value, the cutting machine corrects the inclination of the straightly running portion 18*a* of the blade 18 as shown in FIG. 1(*b*). The correction can be achieved by adjusting the positions of water jets ejected from the nozzle orifices 22*a*, 22*a* provided on the opposed members 22, 22 of the blade member 20, and the pressures of the water jets applied on both sides of the straightly running portion 18*a* of the blade 18. For example, as shown by dot lines of FIG. 3, if it is required to incline the blade 18 rightward as represented in the figure, one of the opposed members 22, 22 is replaced by a different member which has a nozzle orifice 22*a* at a lower position (in the embodiment shown in FIG. 3, the left-side member 22 is replaced). When water jets are applied from the lower shifted nozzle 22*a* and from the normal positioned nozzle 22*a* onto both sides of the blade 18, it is possible to adjust the inclination of the straightly running portion 18*a* of the blade 18 as desired by varying the pressures of the respective water jets. The inclination is reflected in difference between the signals from the first and second eddy current sensors 26 and 27. The difference between the two signals and inclination of the blade 18 reflected in the difference are stored in a memory 29*a* of controller 29. The controller 29 controls the first and second pressure adjustment valves 32, 33 until the signal difference indicates the obtainment of a desired inclination.

In the above example, the lowest end of the blade 18 is inclined to rightward as indicated by dotted lines of FIG. 3. However, if it is required to incline the lowest end of the blade 18 leftward (not illustrated in the figure) instead of rightward, the right opposed member 22 is replaced by a different member having a nozzle orifice 22*a* at a lower position, and then it is possible to adjust the inclination of the straightly running portion 18*a* of the blade 18 as desired by applying water jets from the lower shifted nozzle 22*a* and from the normal positioned nozzle 22*a* on both sides of the blade 18 and by varying the pressures of water jets.

If the straightly running portion 18*a* of the blade 18 is inclined by a certain angle with respect to a line vertical to the longitudinal axis of an ingot 10*a* and the inclination produces a shift A at the lowest end of cut surface 10*b*, the cutting machine corrects the inclination of the blade with respect to the ingot 10*a* so as to cancel out the shift A by tilting the imaginary cut surface 10*c* including the straightly running portion 18*a* of the blade in the opposite direction by a certain angle with respect to a line vertical to the longitudinal axis of ingot 10a, calculating an expected shift B obtained at the lowest end of imaginary cut surface 10c when ingot 10a is assumed to be cut by the tilted blade as shown in FIG. 1(b), and adjusting the tilted angle such that shift B is equal to shift A. Subsequent to correction, cutting is further continued with the straightly running portion 18a of the blade 18 whose inclination has been just corrected. Then, it is possible to cut the ingot 10a along a perpendicular plane as shown in FIG. 1(c).

Even if the preferred cutting direction of the blade 18 diverges from a normal specified direction, it is possible to cancel out the divergence by tilting the straightly running portion 18a of the blade 18 by the same angle with the divergent angle in the opposite direction, and thus it is possible even then to cut an ingot comparatively vertically. According to the cutting machine, water jets are applied from opposed members 22, 22 to both sides of the blade 18, adherence of saw dust to the blade 18 which would otherwise occur can be safely avoided, which will lead to the improved precision of cutting. The pair of opposed members 22, 22 have a space between them which is so large as to allow the blade 18 to smoothly pass through, which will contribute to the maintenance of due life of the involved elements which would be degraded if any frictional contact existed between the two kinds of elements. Moreover, once correction of the inclination of the blade 18 is achieved, application of fluid jets to the surfaces of the blade 18 engaged in cutting is withdrawn which keeps the blade from being exposed to the change of pressure, and relieves the surfaces 10b of cut slices of step-like undulations. Furthermore, since correction of the blade is based only on tilting and does not include any bending, tension of the blade 18 does not change in any way due to the correction operation. Thus, shortening of due life of the blade 18 which would result if tension were increased as a result of correction can be safely avoided.

What is claimed is:

1. A method for cutting a single crystal ingot using a band saw type cutting machine comprising a pair of pulleys (17, 17) rotating around their respective central, vertical axes (17a, 17a) which are separated from each other by a specified distance with an endless belt-like blade (18) being tightly wound around the rims of those pulleys (17, 17), wherein the blade is made to run a circuit via the rotation of pulleys (17, 17), a single crystal ingot (IOa) is arranged below a straight running portion (18a) of the blade such that the longitudinal axis of the ingot (IOa) crosses at right angles with the straight running portion (18a) of the blade, and the pair of pulleys (17, 17) are allowed to descend vertically so that the straight running portion (18a) of the blade is brought into contact with ingot (IOa) below to cut the latter, wherein the method comprises the steps of:
setting the straight running portion (18a) of the blade (18) at right angles with the longitudinal axis of the ingot (IOa);
pre-cutting the ingot (IOa) with the straight running portion (18a) of the blade (18);
detecting a shift (A) from the lowermost position of the cut surface (IOb) of the pre-cut ingot (IOa) to the lowermost position obtained by projecting a first line vertically from the uppermost part of the cut surface (IOb);
adjusting an inclined angle of the straight running portion (18a) of the blade (18) to the ingot (IOa) so as to reduce the detected shift (A); and
continuing, after the adjustment of the inclined angle of the straight running portion (18a), to post-cut the ingot (IOa) with the straight running portion (18a) of the blade (18).

2. The method of claim 1 wherein the adjustment of the inclined angle of the straight running portion (18a) of the blade is carried out by applying fluid jets onto both sides of the straight running portion (18a) of the blade so as to reduce the inclined angle of the blade.

3. The method of claim 2 wherein a pair of members (22, 22) having opposing faces having a space between the opposing faces, the space being larger than the thickness of the blade (18), are provided on both sides of the straight running portion (18a) of the blade (18), and wherein each opposing face of the members is equipped with respective jet nozzles (22a, 22a), wherefrom, if the straight running portion (18a) of the blade is inclined to one side, fluid jets are applied on both sides of the straight running portion (18a) of the blade so as to correct the inclination of the blade.

4. The method of claim 1 wherein the adjustment of the inclined angle of the straight running portion (18a) of the blade is carried out by reducing the detected shift (A) up to a shift (B) being equal to the shift (A), which is opposite to the shift (A) from the uppermost part of the cut surface (IOb) to its lowermost end assuming the second line of cut traversed the entire ingot.

5. An apparatus for cutting a single crystal ingot using a band saw type cutting machine comprising a pair of pulleys (17, 17) rotating around their respective central, vertical axes (17a, 17a) which are separated from each other by a specified distance with an endless belt-like blade (18) being tightly wound around the rims of those pulleys (17, 17), wherein the blade is made to run a circuit via the rotation of pulleys (17, 17), a single crystal ingot (IOa) is arranged below a straight running portion (18a) of the blade such that the longitudinal axis of the ingot (IOa) crosses at right angles with the straight running portion (18a) of the blade, and the pair of pulleys (17, 17) are allowed to descend vertically so that the straight running portion (18a) of the blade is brought into contact with ingot (IOa) below to cut the latter, wherein the apparatus comprises:
means for detecting a shift (A) from the lowermost position of the cut surface (IOb) of the ingot (IOa) to the lowermost position obtained by projecting a first line vertically from the uppermost part of the cut surface (IOb); and
means for adjusting an inclined angle of the straight running portion (18a) of the blade (18) to the ingot (IOa) so as to reduce the detected shift (A).

6. The apparatus of claim 5 wherein means for adjusting an inclined angle comprises a plurality of nozzles which apply fluid jets onto both sides of the straight running portion (18a) of the blade so as to reduce the inclined angle of the blade.

* * * * *